United States Patent [19]

Lin

[11] Patent Number: 5,047,075

[45] Date of Patent: Sep. 10, 1991

[54] DUST BUSTER FILTER FOR A VACUUM CLEANER

[76] Inventor: Ming-Huei Lin, 2F3R, No. 14, Ching Chung St., Tainan, Taiwan

[21] Appl. No.: 360,460

[22] Filed: Jun. 2, 1989

[51] Int. Cl.⁵ .............................................. B01D 46/00
[52] U.S. Cl. ........................................ 55/382; 55/486
[58] Field of Search ................. 55/486, 487, 381, 382, 55/514

[56] References Cited

U.S. PATENT DOCUMENTS 3,410,060 11/1968 Reilly ...................................... 55/382
4,116,648 9/1978 Busch .................................... 55/382
4,274,847 6/1981 Crenez .................................. 55/381

Primary Examiner—Bernard Nozick

[57] ABSTRACT

A dust buster filter for a vacuum cleaner made up of three layers of unwoven cloth having their circumfertical edges fused together with plastic rings by means of a super-sonic fusing machine and a dirt entrance joined with the upper layer of unwoven cloth with glue. The dirt entrance is provided with four protrusions fitting into glued with four holes in the upper layer of unwoven cloth.

1 Claim, 4 Drawing Sheets a dirt entrance provided for the air blown by a blower to pass through into the filter body is to be joined with the upper layer of unwoven cloth. In order to join the both firmly and unseparably, the dirt entrance is provided with a flat rim around its central opening and the rim has four cylindrical protrusions to fit into four holes in the upper layer of the filter body. Said protrusions correspond with and fit into said holes properly spaced apart. The rim of the dirt entrance and the corresponding section of the upper layer are glued together, and said protrusions and said holes are also glued together after fitted with each other, and the both can be held together firmly and unseparably, withstanding the blown air coming from the blower in a vacuum cleaner.

DUST BUSTER FILTER FOR A VACUUM CLEANER

BACKGROUND OF THE INVENTION

At present there are two methods in joining the dirt entrance with the upper layer of unwoven cloth for a dust buster filter for a vacuum cleaner. One is to join them directly together by sewing, and the other is to join them together by furing them together by means of high frequency. But there is no cylindrical protrusions on the back surface of the dirt entrance, or small holes on the upper layer of unwoven cloth for firmly joining the both together. However, a dust buster filter has to withstand the force of blown air coming from a blower and to keep dirt therein it is quite important that the plastic section of the filter body is firmly joined with the upper layer of the filter body such that the both do not separate from each other under the strong blowing force.

The joining methods just mentioned above have the following shortcoming.

1. The sewing method causes bad outward appearance and the thread sewn may be often broken owing to moisture so that the both, the dirt entrance and the filter body, can lose their function, separated from each other.

2. The fusing method with high frequency or super-sonic wave costs high for mass production because of expensiveness of its equipment.

Therefore, this invention has been devised, based upon several years' experience by improving the joining method in manufacturing dust buster filter for a vacuum cleaner.

SUMMARY OF THE INVENTION

The dust buster filter for a vacuum cleaner in accordance with the present invention has been designed to have the following features.

1. The dirt entrance is provided with a circumferential rim having four cylindrical protrusions properly spaced apart on its back surface, and the upper layer of unwoven cloth of the filter body is provided with four small holes corresponding with said protrusions on the dirt entrance to be fitted in by said protrusions. Hot melted glue is to be coated on the joining section of the upper layer of unwoven cloth and on the rim of the dirt entrance before joining the both together. In joining, said protrusions have to insert in said small holes and to be glued therein and the back surface of the rim of the dirt entrance is to be glued with the joining section of the upper layer of unwoven cloth for joining the both together firmly.

2. The filter body is made of three layer of unwoven cloth, whose rectangular edges are fused together with two layers of plastic leather put between them by means of a super-sonic compressing process so that the filter body can have closely sealed circumferential edge to prevent air from leaking thereout.

The dust buster filter for a vacuum cleaner in accordance with the present invention is made up of three layers of unwoven cloth. Two neighboring layers respectively sandwith a plastic ring of the same circumferential shapes as the filter body, and then the edges of all the three layers and two plastic rings are fused together with a super-sonic fusing machine to prevent air from leaking therefrom.

DETAILED DESCRIPTION OF THE INVENTION

Figure 1:
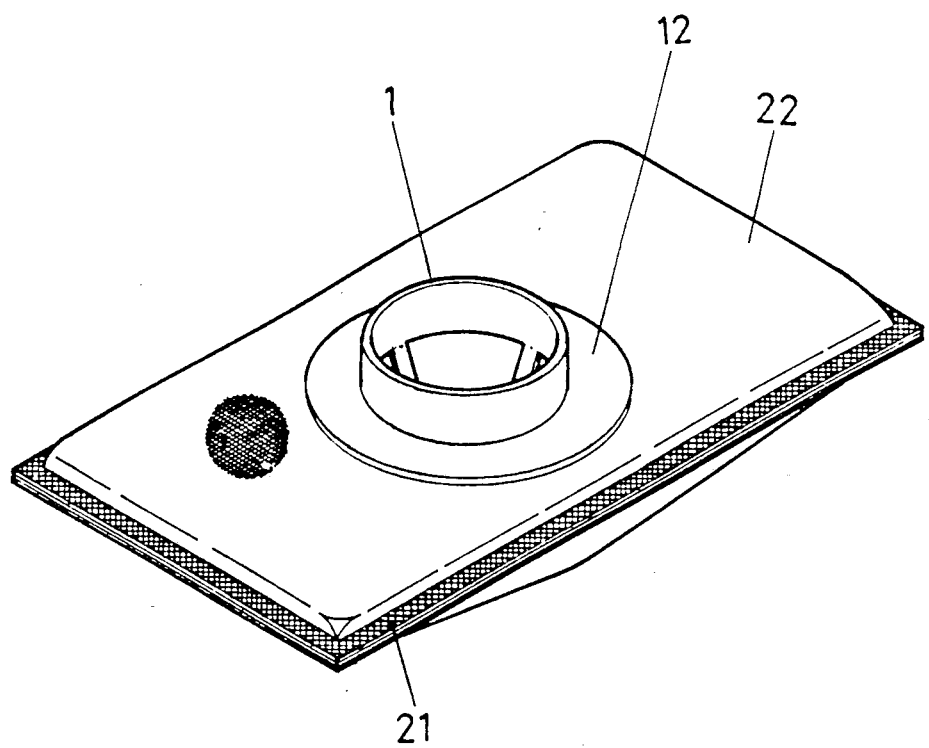
FIG. 1 is a perspective view of the dust buster filter for a vacuum cleaner in accordance with the present invention.
Figure 2:
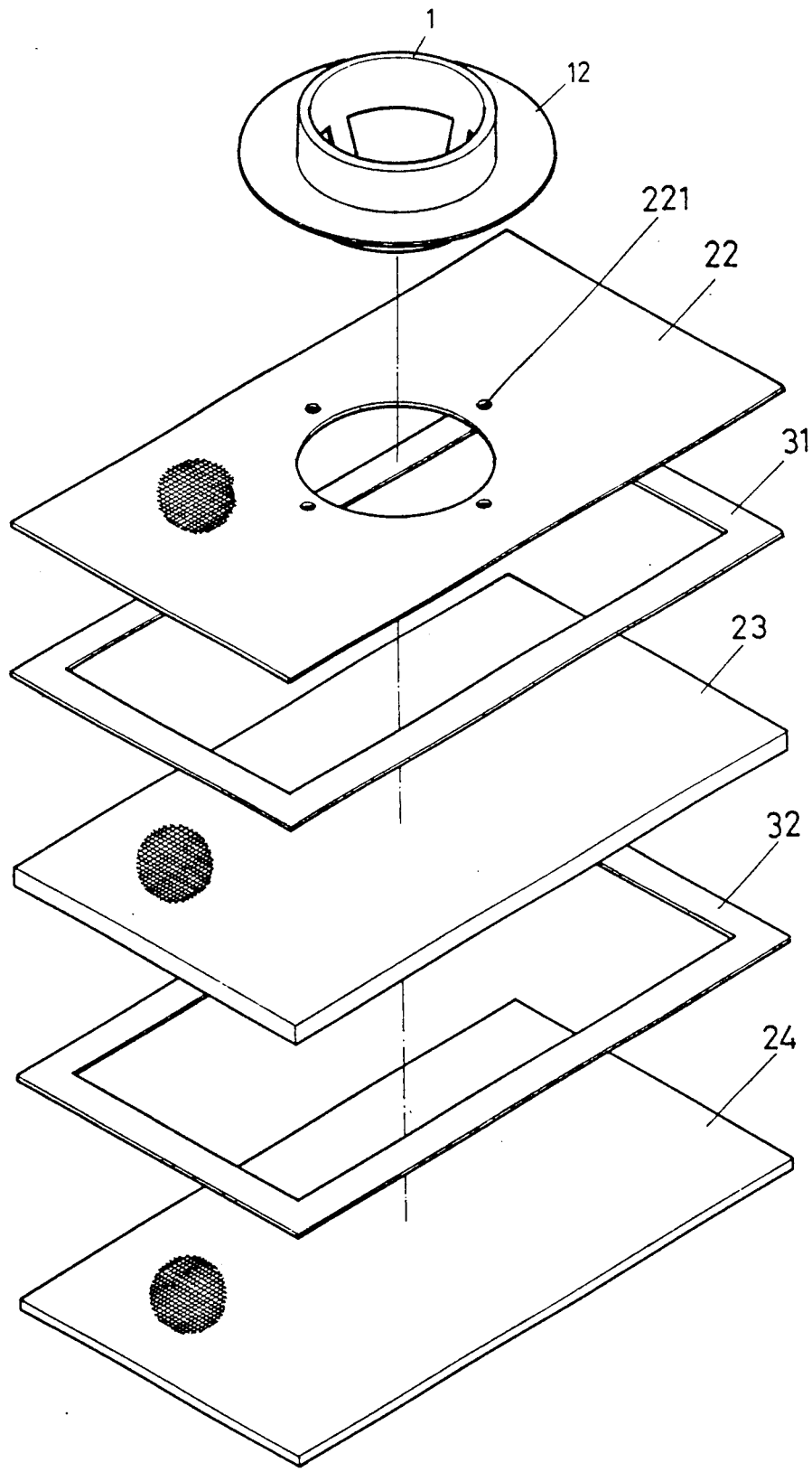
FIG. 2 is an exploded perspective view of the dust buster filter for a vacuum cleaner in accordance with the present invention.
Figure 4:
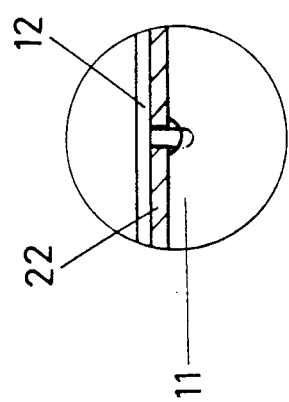
FIG. 4 is an enlarged view of Part A on FIG. 3.
Figure 6:
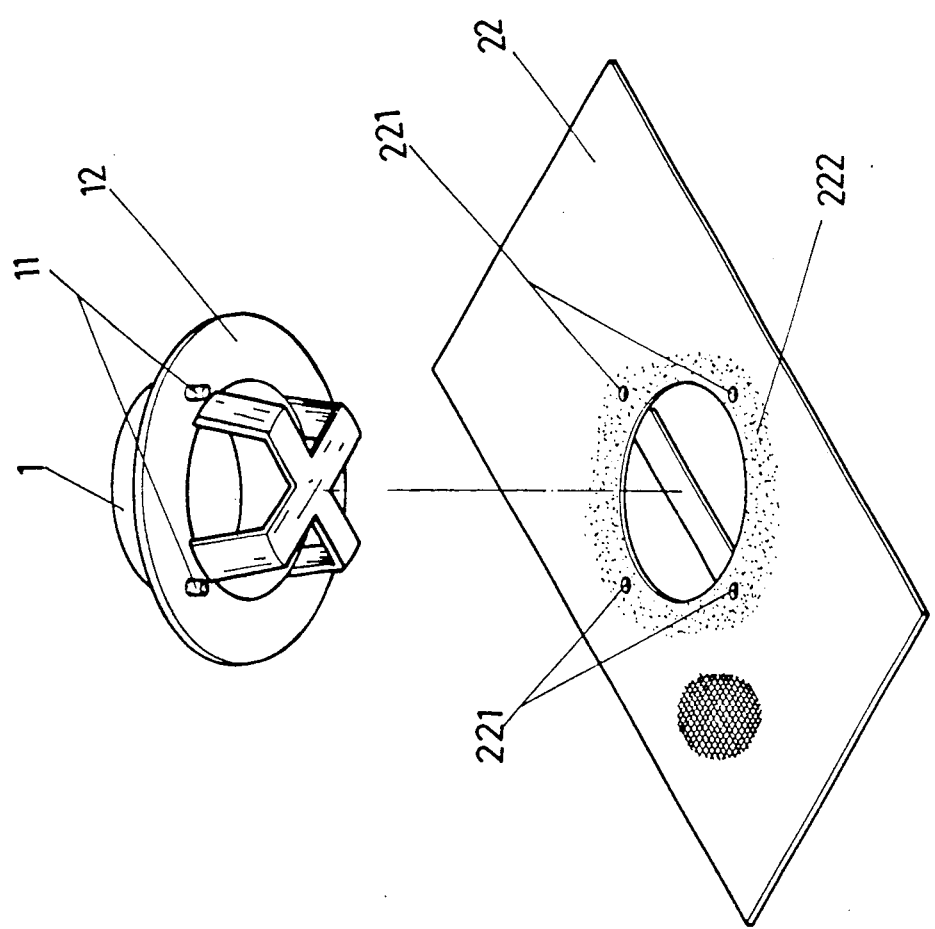
FIG. 6 is a perspective view of the dirt entrance separated from the upper layer of unwoven cloth in accordance with the present invention.

The dust buster filter in this invention shown in FIG. 1 comprises a dirt entrance 1 and a filter body 2 having a circumferential edge 21 fused together with compression by a high-pressurized super-sonic machine. The dirt entrance 1 has a circumferential rim 12 around its central opening as shown in FIGS. 4 and 6 and four cylindrical protrusions 11 properly spaced apart are provided extending downward from the back surface of said rim 12. The length of said protrusions 11 is just a little layer 22 of unwoven cloth so that said protrusions 11 and said holes 221 can correspond with each other, the former 11 possible to penetrate the latter 221.

In joining the dirt entrance 1 with the upper layer 22 of unwoven cloth, the back surface of the rim 12 of the dirt entrance 1 and the corresponding section of the upper layer 22 have to be previously coated with hot melted glue and then to be put together and dried up. Meanwhile, the four protrusions 11 are made to fit into the holes 221 and fused with each other by hot melted glue so that said entrance 1 and said upper layer 22 may be firmly and unseparably joined together. Especially, the four fused points formed by said protrusions 11 and said holes 221 can hole firmly together the both 1 and 22, which never separate from each other after joined together.

Figure 5:
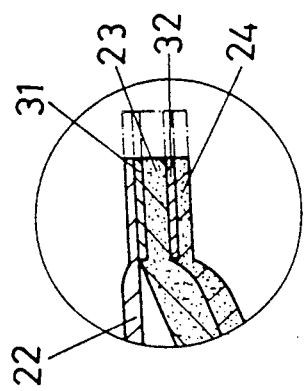
FIG. 5 is an enlarged view of Part B on FIG. 3.
Figure 3:
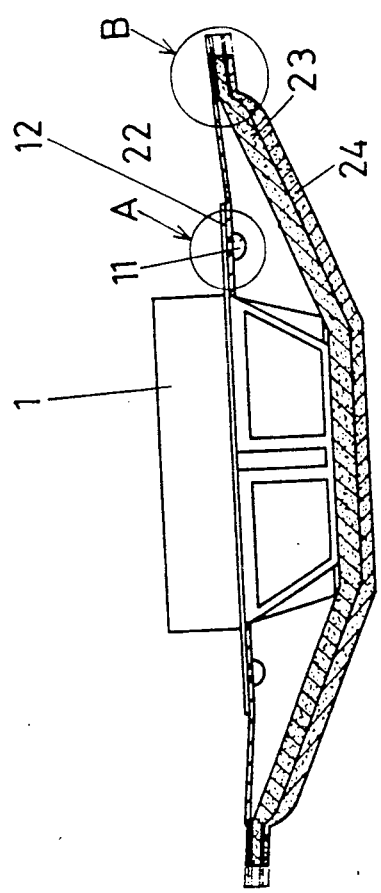
FIG. 3 is a cross-sectional view of the dust buster filter for a vacuum cleaner in accordance with the present invention.

Next, the filter body 1 has a middle layer 23 of unwoven cloth comparatively thick and soft, and a lower layer 24 of unwoven cloth rather thin and soft, are joined wholly together. Besides, a rectangular plastic ring 31 or 32 is respectively set sandwitched between the upper layer 22 and the middle layer 23 and between the middle layer 23 and the lower layer 24 at their circumferential edges, and all the circumferential edges of all the three layers 22, 23, 24 and the plastic rings 31, 32 are fused together by melting the plastic rings 31, 32 by means of a high-pressurized super-sonic machine, as shown in FIGS. 3 and 5, to keep the filter in a good shape withstanding the force of the blown air coming from the blower in a vacuum cleaner.

What is claimed is:

1. A dust buster filter for a vacuum cleaner comprising:

a filter body made up of three layers of unwoven cloth of different thickness, said three layers of unwoven cloth sandwitching a plastic rectangular ring between the edges of every two neighboring layers, said three layers of unwoven cloth and said two plastic rings being fused together by means of a super-sonic fusing machine, the upper layer of unwoven cloth provided with four holes properly spaced apart to correspond with and fitted into by four cylindrical protrusions on the back surface of the rim of a dirt entrance;

a dirt entrance being provided with a circumferential flat rim around its central opening, said rim being provided with four cylindrical protrusions to correspond with and fit into the four holes in the upper layer of unwoven cloth; and said upper layer of unwoven cloth and said rim of the dirt entrance being joined firmly with each other with hot melted glue, and said four protrusions on said rim fitting into and glued with said four holes in said upper layer of unwoven cloth by means of hot melted glue such that dirt entrance may be firmly and unseparably joined with said upper layer of unwoven cloth.

* * * * *